(12) United States Patent
Chang

(10) Patent No.: US 6,840,634 B1
(45) Date of Patent: Jan. 11, 2005

(54) REFLECTIVE PROJECTION DISPLAY SYSTEM

(75) Inventor: Sean Chang, Taoyuan County (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/850,526

(22) Filed: May 19, 2004

(30) Foreign Application Priority Data

Oct. 6, 2003 (TW) ........................................ 92127692 A

(51) Int. Cl.[7] .................... G03B 21/28; G03B 21/00; H04N 5/74; G02B 5/08; G02B 7/182

(52) U.S. Cl. ......................... 353/99; 353/33; 353/81; 348/771; 359/291; 359/834; 359/850

(58) Field of Search .................. 353/31, 33, 34, 353/37, 81, 82, 98, 99; 348/771; 359/831, 833, 834, 291, 850

(56) References Cited

U.S. PATENT DOCUMENTS 6,454,417 B1 * 9/2002 Takamoto et al. ............ 353/33
6,560,048 B1 * 5/2003 Okamori et al. ............ 359/833
6,583,940 B2 * 6/2003 Nishikawa et al. .......... 359/738
2003/0142278 A1 * 7/2003 Yamamoto .................... 353/31
2003/0189692 A1 * 10/2003 Kawano et al. ............... 353/31
2004/0008402 A1 * 1/2004 Patel et al. .................. 359/291
2004/0125347 A1 * 7/2004 Patel et al. .................... 353/98

* cited by examiner

Primary Examiner—Judy Nguyen
Assistant Examiner—Melissa J Koval
(74) Attorney, Agent, or Firm—Martine & Penilla, LLP

(57) ABSTRACT

A reflective projection display system for receiving a light ray and projecting it onto a screen in a light-state mode. The reflective projection display system includes a reflective micro-mirror panel, a projecting device and a prism set. Before reaching the reflective micro-mirror panel, the light ray is firstly reflected by the prism set. The light ray reflected by the reflective micro-mirror panel in the light-state mode directly passes through the prism set and is then received by the projection lens. The light ray reflected by the reflective micro-mirror panel in the dark-state mode is totally reflected at an interface between a prism adjacent to the reflective micro-mirror panel and an air gap adjacent to the prism.

16 Claims, 5 Drawing Sheets

REFLECTIVE PROJECTION DISPLAY SYSTEM

BACKGROUND OF THE INVENTION

1. Field of the Invention

The invention relates to a reflective projection display system and, more particularly, to a projection display system using reflective micro-mirrors.

2. Description of the Related Art

Recently, a technology of using reflective micro-mirrors to project images on large-scale monitors such as back projection televisions draws more and more attention and develops actively. The technology originated in the digital light processing technology, the imaging principle of which will be described in the following, developed by the Texas Instruments in 1987.

As shown in FIG. 1, the uniformly incident light rays 111 outputted from an illumination device 11 to enter a prism set 12 composed of two prisms 121 and 122 are reflected by the prism set 12 and then projected onto a DMD (Digital Micro-mirror Device) 13 composed of ten thousands of micro-mirrors (not shown). Each micro-mirror on the DMD 13 has its individual driving electrode and steering shaft. In a light-state mode, these micro-mirrors reflect the incident light rays 111a to let the incident light rays 111a pass the prisms 121 and 122 and enter a projection lens 141 that focuses the light rays onto a screen (not shown). On the other hand, in a dark-state mode, these micro-mirrors are tilted with a specific angle by applying voltages to their driving electrodes in order to lead the incident light rays 111a away from optical axis 15 of the projection lens 141 after the incident light rays 111a passes through the prism set 12.

However, since the deviation light rays 111c in the dark-state mode are output over the prism set 12, it is necessary to keep a predetermined distance LD between the prism set 12 and the projection lens 141 in order to prevent the projection lens 141 from receiving the deviation light rays 111c and to improve the contrast of the projection display system 1. Consequently, such a method can increase the back focal distance $L_B$ and thus enlarge the overall thickness $L_T$ of the projection display system 1; therefore, there are difficulties in a wide-angle design, which preferably needs shorter back focal distance, of the projection lens 141.

On the other hand, although a projection lens 141 with a small aperture $\phi_p$ can be used to lower the design and manufacturing costs of the projection lens 141 and thus to shorten the distance $L_D$ between the projection lens 141 and the prism set 12 and to decrease the overall thickness $L_T$ of the projection display system, the reduction of the distance $L_D$ between the projection lens 141 and the prism set 12 is always limited by the fact that the deviation light rays 111c are always output from the top of the prism set 12. Therefore, it is difficult to effectively reduce the overall thickness of the projection display system 1.

Consequently, it is necessary to find a low-cost solution for enhancing the contrast of the projection display system as well as reducing the overall thickness of the projection display system in these days when the image quality requirements for the large-scale monitor of the projection display system is getting more and more demanding in the consumer market.

The invention discloses a projection display system using reflective micro-mirrors and shortening the back focal distance of the projection display system and reducing the overall thickness of the projection display system without damaging high brightness and high contrast in the projection display system to fundamentally solve the problems of the prior art.

SUMMARY OF THE INVENTION

The invention is proposed to solve the problems incapable of simultaneously enhancing the contrast and reducing the system thickness of the conventional projection display system.

An object of the invention is to provide a reflective projection display system with high contrast.

Another object of the invention is to provide a reflective projection display system with a minimum system thickness.

The reflective projection display system of the invention is for receiving a light ray and projecting the light ray onto a screen in a first mode and includes a reflective micro-mirror panel, a projecting device and a prism set. In one aspect, the reflective micro-mirror panel according to the invention includes a plurality of micro-mirrors, each of which has a steering shaft and turns around the steering shaft within a specific angle range. The reflective micro-mirror panel reflects the light ray toward a direction parallel to the optical axis of the reflective projection display system in the first mode, and reflects the light ray away from the optical axis of the reflective projection display system in a second mode.

The invention has the following advantages. First, the back focus of the projection display system is reduced. Second, the deviation light ray and stray light ray in the dark-state mode are free from entering the projection lens, and the contrast of the projection display system is enhanced accordingly. Third, the overall volume and thickness of the projection display system is effectively reduced.

DETAILED DESCRIPTION OF THE INVENTION

Figure 2A:
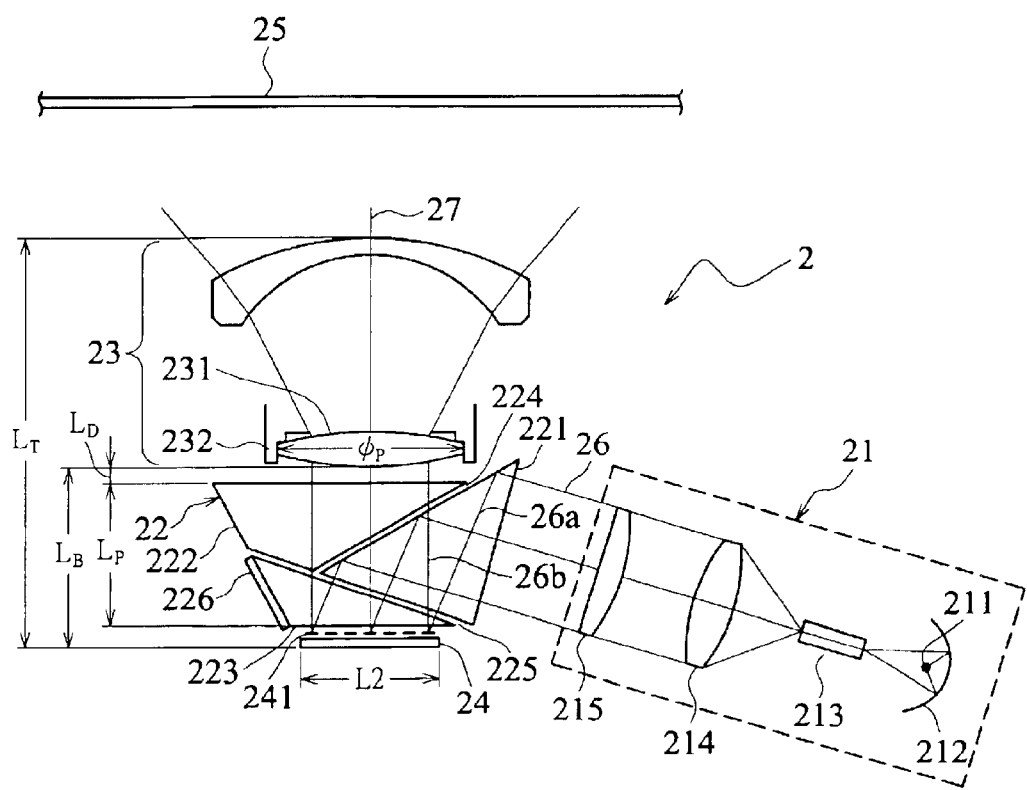
FIG. 2A is a schematic illustration showing the projection of the reflective projection display system in the light-state mode according to a first embodiment of the invention.
Figure 2B:
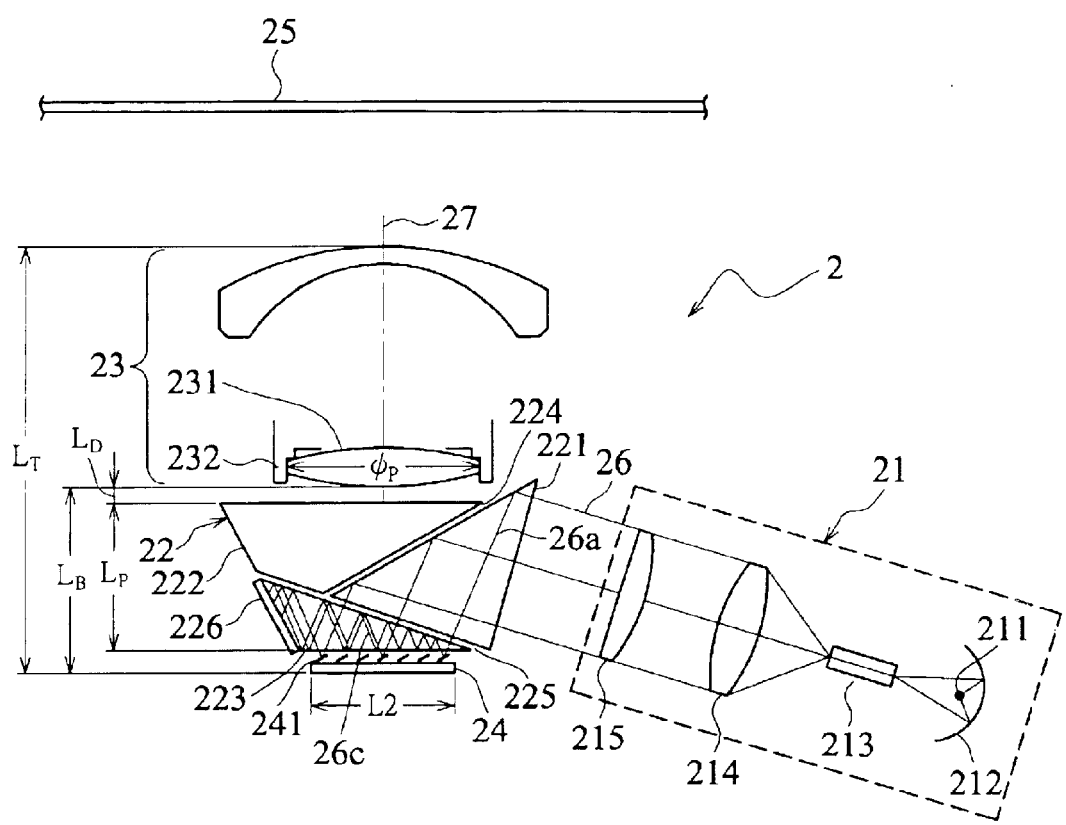
FIG. 2B is a schematic illustration showing the projection of the reflective projection display system in the dark-state mode according to the first embodiment of the invention.

Referring to FIGS. 2A and 2B, a reflective projection display system 2 according to a first embodiment of the invention includes an illumination device 21, a prism set 22, a projecting device 23, and a reflective micro-mirror panel 24. The prism set 22 is arranged among the illumination device 21, the projecting device 23 and the reflective micro-mirror panel 24. The reflective projection display system 2 according to the first embodiment will be described in detail as follows.

The illumination device 21 includes a light source 211, a lamp shade 212, a light guide 213, a relay lens 214 and a collecting lens 215. The light source 211, the lamp shade 212 and the light guide 213 is so arranged that the light rays output from the light source 211 enters the light guide 213, passes through the relay lens 214 and the collecting lens 215, and then enters the prism set 22.

The prism set 22 includes three total internal reflection (TIR) prisms 221, 222 and 223 with an air gap 224 existing between the prism 221 and the prism 222, an air gap 225 existing between the prism 223 and the prism 221 and between the prism 223 and the prism 222. The prism 223 is close to the reflective micro-mirror panel 24 and is formed with a light-absorbing substance 226 at a side thereof.

The projecting device 23 includes a projection lens 231 and a lens tube 232. The projection lens 231 receives light rays 26b that is reflected by the reflective micro-mirror panel 24 and passes through the prism set 22, and projects the light rays 26b onto a screen 25 in a direction parallel to the optical axis 27. The lens tube 232 is used to prevent stray light rays outside the projection display system from entering the projection lens 231.

Figure 3:
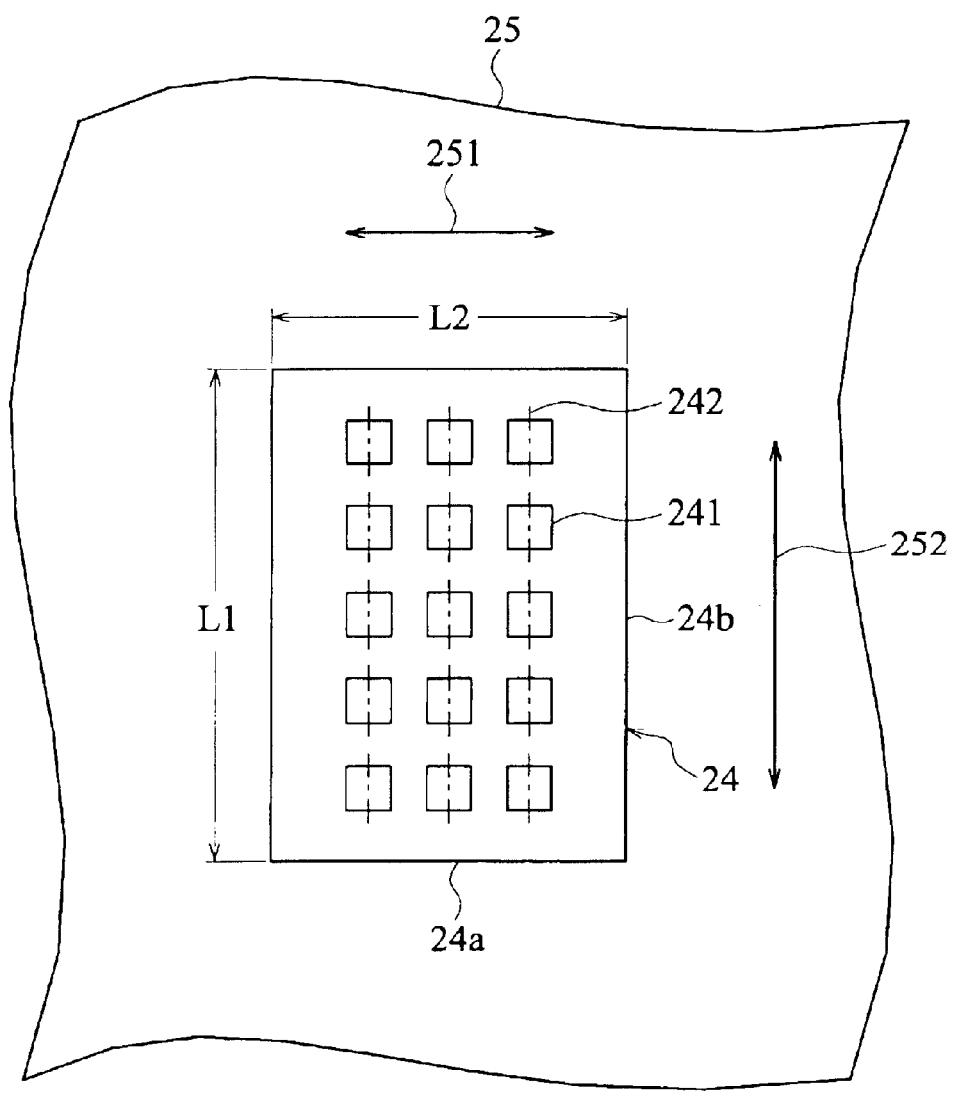
FIG. 3 is a schematic illustration showing an arrangement relationship between a screen and a reflective micro-mirror panel of the reflective projection display system according to the first embodiment of the invention.

The reflective micro-mirror panel 24 has a plurality of micro-mirrors 241, each of which has a variable angle of inclination. The detailed arrangement of the reflective micro-mirror panel 24 and the micro-mirrors 241 are shown in FIG. 3. Each micro-mirror 241 turns around a steering shaft 242 within a specific angle range.

As to the projection principle of the reflective projection display system 2, the detail is as follows.

In the light-state mode, as shown in FIG. 2A, the light rays 26 output from the illumination device 21 is reflected to the reflective micro-mirror panel 24 by the prism 221 after entering the prism set 22. Next, the light rays 26b reflected by the micro-mirrors 241 on the reflective micro-mirror panel 24 sequentially passes through the prism 223, the air gap 225, the prism 221, the air gap 224, and the prism 222, and then enters the projection lens 231.

In the dark-state mode, as shown in FIG. 2B, the light rays 26 output from the illumination device 21 is reflected to the reflective micro-mirror panel 24 by the prism 221 after entering the prism set 22, which is the same as that in the light-state mode. However, each of the micro-mirrors 241 has turned such a specific angle around the steering shaft 242 that the incident light rays 26a are reflected to an interface between the prism 223 adjacent to the reflective micro-mirror panel 24 and the air gap 225, and the reflected light rays 26c are under a total internal reflection inside the prism 223. Next, the light-absorbing substance 226 of the prism 223 absorbs the totally internal reflected light rays in the prism 223 so that the reflected light rays 26c deviate from optical axis 27 and is free from entering the projection lens 231.

In this embodiment, the light rays 26c reflected by the micro-mirrors 241 in the dark-state mode can be completely led away from the projection lens 231 of the projecting device 23. Accordingly, the distance $L_D$ between the projection lens 231 and the prism 222 of the prism set 22 can be greatly shortened. In addition, the design of the lens tube 232 depends only on the imaging requirement in the light-state mode, and there is no need to provide additional peripheral device to avoid the deviation light rays in the dark-state mode. In addition, the contrast and brightness of the overall projection display system 2 can be effectively enhanced.

In this way, we can adopt the projection lens 231 having the smaller aperture $\phi_p$ and the prism set 22 having the smaller thickness $L_p$ to reduce the manufacturing costs of the projection lens and the prism set, and make the designs of the projection lens and the prism set easier without influencing the contrast of the whole projection display system 2 because the light rays 26c reflected by the micro-mirrors 241 in the dark-state mode can be completely led away from the projection lens 231 of the projecting device 23 and the projection lens 231 can be close to the prism 222 of the prism set 22. Specifically, as shown in FIG. 3, the embodiment adopts square micro-mirrors 241 and a rectangular reflective micro-mirror panel 24. The ratio of the length L1 of the rectangular reflective micro-mirror panel 24 to the width L2 of the rectangular reflective micro-mirror panel 24 can be 4/3 or 16/9. The short side 24a of the reflective micro-mirror panel 24 is optically parallel to the transversal direction 251 of the screen 25, the long side 24b of the reflective micro-mirror panel 24 is optically parallel to the longitudinal direction 252 of the screen 25, and the steering shaft 242 of each micro-mirror 241 is optically parallel to the longitudinal direction 252 of the screen 25. In this case, the steering shafts 242 of the micro-mirrors 241 are parallel to the long side 24b of the reflective micro-mirror panel 24. Consequently, the reflective micro-mirror panel 24 has a shortest span L2 in the transversal direction 251 of the screen 25, and we can correspondingly adopt the projection lens 231 with the small aperture $\phi_p$ and the prism set 22 with the small thickness $L_p$. Accordingly, the back focal distance LB of the projection display system 2 can be further reduced, the projection display system 2 can have a smaller volume, the manufacturing cost can be reduced, and the designs of the projection lens and the prisms can become easier.

Figure 1:
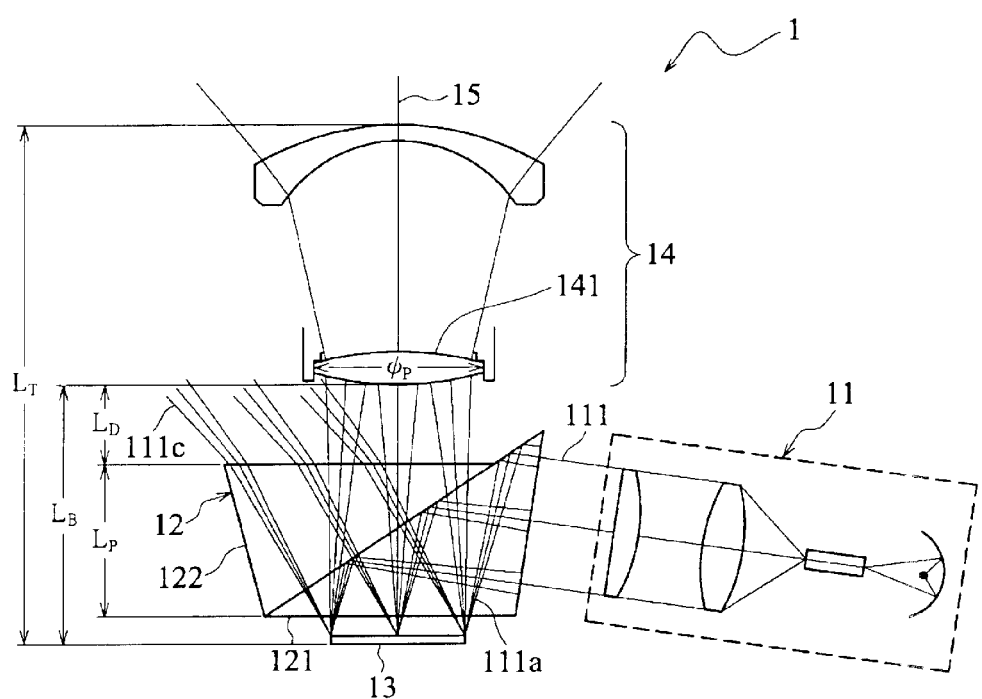
FIG. 1 is a schematic illustration showing a conventional reflective projection display system.

For example, as shown in FIGS. 2A and 2B, the thickness $L_p$ of the prism set 22 adopted in this embodiment is 15.1457 mm, which is 1/1.67 times that (25.31 mm) of the prior art of FIG. 1, and the back focal distance $L_B$ of the projection display system 2 is 18.2531 mm, which is 1/2.66 times that (48.5431 mm) of the prior art of FIG. 1. Obviously, the invention utilizes the prism set 22 composed of three total internal reflection prisms and the arrangement of the reflective micro-mirror panel 24 to lead the light rays 26c reflected from the micro-mirrors 241 of the reflective micro-mirror panel 24 in the dark-state mode away from the projection lens 231, and thus shorten the distance $L_D$ between the projection lens 231 and the prism set 22 to a minimum without worrying about that the projection lens 231 will receive the deviation light rays. Therefore, the projection lens 231 with a small aperture $\phi_p$ and the prism set 22 with a small thickness $L_p$ can be utilized to effectively reduce the back focal distance $L_B$ of the projection display system and the thickness $L_T$ of the whole projection display system 2.

Figure 4:
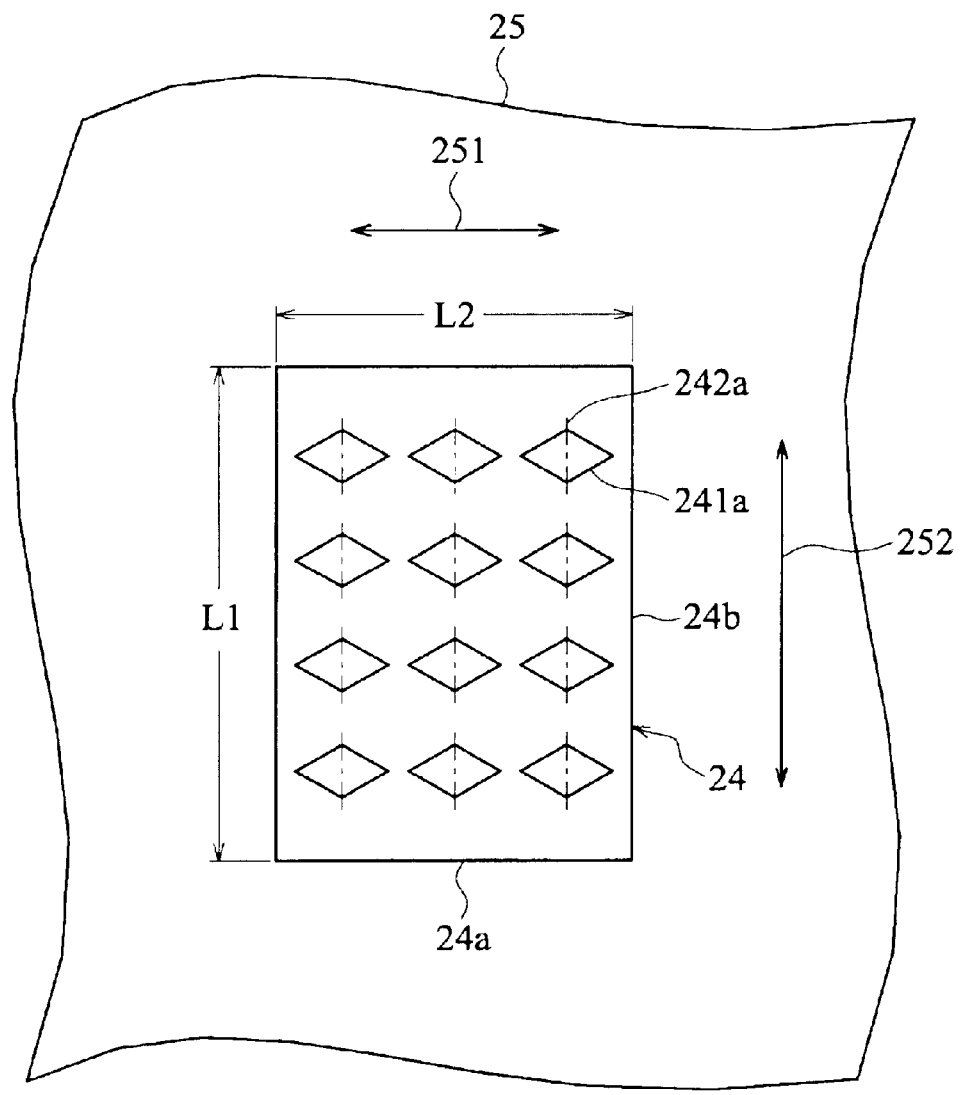
FIG. 4 is a schematic illustration showing an arrangement relationship between the screen and a reflective micro-mirror panel of the reflective projection display system according to a second embodiment of the invention.

On the other hand, in a second embodiment of the invention, except that the reflective micro-mirror panel 24 is disposed as shown in FIG. 4, other elements of the reflective projection display system 2 are the same as those of the first embodiment, and detailed descriptions thereof will be omitted. The rectangular reflective micro-mirror panel 24 in this embodiment still has the length L1 and the width L2, wherein the ratio of L1 to L2 can be 4/3 or 16/9. The second embodiment is different from the first embodiment in that rhombus micro-mirrors 241a are adopted. In this embodiment, the short side 24a of the reflective micro-mirror panel 24 is optically parallel to the transversal direction 251 of the screen 25. That is, the span L2 of the reflective micro-mirror panel 24 in the transversal direction 251 of the screen 25 is smaller than the span L1 in the longitudinal direction 252 of the screen 25. In addition, the steering shaft 242b of each micro-mirror 241b is optically parallel to the longitudinal direction 252 of the screen 25. In other words, the micro-mirrors of the reflective micro-mirror panel of the invention can be of any shape such as the rectangular, circular, or elliptic shape as long as the micro-mirrors 241b are so disposed that the their steering shafts 242b are optically parallel to the longitudinal direction 252 of the screen 25 according to the idea of the invention.

While the invention has been described by way of examples and preferred embodiments, it is to be understood that the invention is not limited to the disclosed embodiments. To the contrary, the invention is intended to cover various modifications. Therefore, the scope of the appended claims should be accorded the broadest interpretation so as to encompass all such modifications.

What is claimed is:

1. A reflective projection display system for receiving a light ray and projecting the light ray onto a screen in a first mode, comprising:
    a reflective micro-mirror panel having a plurality of micro-mirrors, each of which has a steering shaft and turns around the steering shaft within a specific angle range, to reflect the light ray toward a direction parallel to an optical axis of the reflective projection display system in the first mode and reflect the light ray away from the optical axis of the reflective projection display system in a second mode;
    a projecting device having a projection lens for receiving the light ray reflected by the reflective micro-mirror panel in the first mode and projecting the light ray onto the screen; and
    a prism set arranged between the reflective micro-mirror panel and the projecting device, having a first prism, a second prism and a third prism close to the reflective micro-mirror panel, and having a first air gap existing between the first prism and the second prism, a second air gap existing between the third prism and the first prism and between the third prism and the second prism;
    wherein the light ray is reflected by the first prism before reaching the reflective micro-mirror panel, the light ray reflected by the reflective micro-mirror panel in the first mode directly passes through the prism set and is then received by the projection lens, and the light ray reflected by the reflective micro-mirror panel in the second mode is totally reflected at an interface between the third prism and the second air gap; and
    wherein a span of the reflective micro-mirror panel in a transversal direction of the screen is smaller than a span of the reflective micro-mirror panel in a longitudinal direction of the screen, and the steering shafts of the micro-mirrors are optically parallel to the longitudinal direction of the screen.

2. The reflective projection display system according to claim 1, wherein the steering shafts of the micro-mirrors are optically parallel to a long side of the reflective micro-mirror panel.

3. The reflective projection display system according to claim 1, wherein the light ray totally reflected at the interface between the third prism and the second air gap in the second mode is totally internally reflected inside the third prism.

4. The reflective projection display system according to claim 1, wherein a light-absorbing substance is formed around the third prism.

5. The reflective projection display system according to claim 1, wherein the projecting device further comprises a lens tube.

6. The reflective projection display system according to claim 1, wherein each of the micro-mirrors has a shape selected from a group consisting of a rectangular, rhombus, circular and elliptic shapes.

7. The reflective projection display system according to claim 1, further comprising an illumination device having a light source for outputting the light ray.

8. The reflective projection display system according to claim 7, wherein the illumination device further comprises a light guide and a relay lens.

9. A reflective projection display system for receiving a light ray and projecting the light ray onto a screen in a first mode, comprising:
    a reflective micro-mirror panel having a plurality of micro-mirrors, each of which has a steering shaft and turns around the steering shaft within a specific angle range, to reflect the light ray toward a direction parallel to an optical axis of the reflective projection display system in the first mode and reflect the light ray away from the optical axis of the reflective projection display system in a second mode;
    a projecting device having a projection lens for receiving the light ray reflected by the reflective micro-mirror panel in the first mode and projecting the light ray onto the screen; and
    a prism set having a plurality of prisms arranged between the reflective micro-mirror panel and the projecting device with air gaps existing between any two adjacent prisms;
    wherein the light ray is reflected by the prism set before reaching the reflective micro-mirror panel, the light ray reflected by the reflective micro-mirror panel in the first mode directly passes through the prism set and is then received by the projection lens, and the light ray reflected by the reflective micro-mirror panel in the second mode is totally reflected at an interface between the prism adjacent to the reflective micro-mirror panel and the air gap adjacent to the prism; and
    wherein a span of the reflective micro-mirror panel in a transversal direction of the screen is smaller than a span of the reflective micro-mirror panel in a longitudinal direction of the screen, and the steering shafts of the micro-mirrors are optically parallel to the longitudinal direction of the screen.

10. The reflective projection display system according to claim 9, wherein the light ray totally reflected at the interface between the prism adjacent to the reflective micro-mirror panel and the air gap adjacent to the prism is totally internally reflected inside the prism adjacent to the reflective micro-mirror panel.

11. The reflective projection display system according to claim 9, wherein the steering shafts of the micro-mirrors are optically parallel to a long side of the reflective micro-mirror panel.

12. The reflective projection display system according to claim 9, wherein a light-absorbing substance is formed around the prism adjacent to the reflective micro-mirror panel.

13. The reflective projection display system according to claim 9, wherein the projecting device further comprises a lens tube.

14. The reflective projection display system according to claim 9, wherein each of the micro-mirrors has a shape selected from a group consisting of a rectangular, rhombus, circular and elliptic shapes.

15. The reflective projection display system according to claim 9, further comprising an illumination device having a light source for outputting the light ray.

16. The reflective projection display system according to claim 15, wherein the illumination device further comprises a light guide and a relay lens.

* * * * *